United States Patent
Chajdas et al.

(10) Patent No.: US 11,854,138 B2
(45) Date of Patent: Dec. 26, 2023

(54) TECHNIQUES FOR INTRODUCING ORIENTED BOUNDING BOXES INTO BOUNDING VOLUME HIERARCHY

(71) Applicant: Advanced Micro Devices, Inc., Santa Clara, CA (US)

(72) Inventors: Matthäus G Chajdas, Munich (DE); Michael A. Kern, Munich (DE); David Ronald Oldcorn, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/384,673

(22) Filed: Jul. 23, 2021

(65) Prior Publication Data

US 2023/0027725 A1    Jan. 26, 2023

(51) Int. Cl.
*G06T 15/06* (2011.01)
*G06T 19/20* (2011.01)

(52) U.S. Cl.
CPC .............. *G06T 15/06* (2013.01); *G06T 19/20* (2013.01); *G06T 2210/12* (2013.01); *G06T 2210/21* (2013.01); *G06T 2219/2016* (2013.01)

(58) Field of Classification Search
None
See application file for complete search history.

(56) References Cited

U.S. PATENT DOCUMENTS

| 10,936,902 B1* | 3/2021 | Bagwell | B60W 60/001 |
| 2020/0326179 A1* | 10/2020 | Tong | G06V 20/58 |
| 2022/0020201 A1* | 1/2022 | Fenney | G06T 17/005 |

FOREIGN PATENT DOCUMENTS

| CN | 102368280 | * | 3/2012 | G06T 17/50 |

OTHER PUBLICATIONS

"A Minimal Ray-Tracer: Rendering Simple Shapes (Sphere, Cube, Disk, Plane, etc.)", downloaded from https://www.scratchapixel.com/lessons/3d-basic-rendering/minimal-ray-tracer-rendering-simple-shapes/ray-box-intersection on Jul. 23, 2021.
"Picking with Custom Ray-OBB Function", downloaded from http://www.opengl-tutorial.org/miscellaneous/clicking-on-objects/picking-with-custom-ray-obb-function/ on Jul. 23, 2021.

* cited by examiner

*Primary Examiner* — Andrew G Yang
(74) *Attorney, Agent, or Firm* — Volpe Koenig

(57) ABSTRACT

Described herein is a technique for modifying a bounding volume hierarchy. The techniques include combining preferred orientations of child nodes of a first bounding box node to generate a first preferred orientation; based on the first preferred orientation, converting one or more child nodes of the first bounding box node into one or more oriented bounding box nodes; combining preferred orientations of child nodes of a second bounding box node to generate a second preferred orientation; and based on the second preferred orientation, maintaining one or more children of the second bounding box node as non-oriented bounding box nodes.

20 Claims, 7 Drawing Sheets

TECHNIQUES FOR INTRODUCING ORIENTED BOUNDING BOXES INTO BOUNDING VOLUME HIERARCHY

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a technique for modifying a bounding volume hierarchy. The techniques include combining preferred orientations of child nodes of a first bounding box node to generate a first preferred orientation; based on the first preferred orientation, converting one or more child nodes of the first bounding box node into one or more oriented bounding box nodes; combining preferred orientations of child nodes of a second bounding box node to generate a second preferred orientation; and based on the second preferred orientation, maintaining one or more children of the second bounding box node as non-oriented bounding box nodes.

Figure 1:
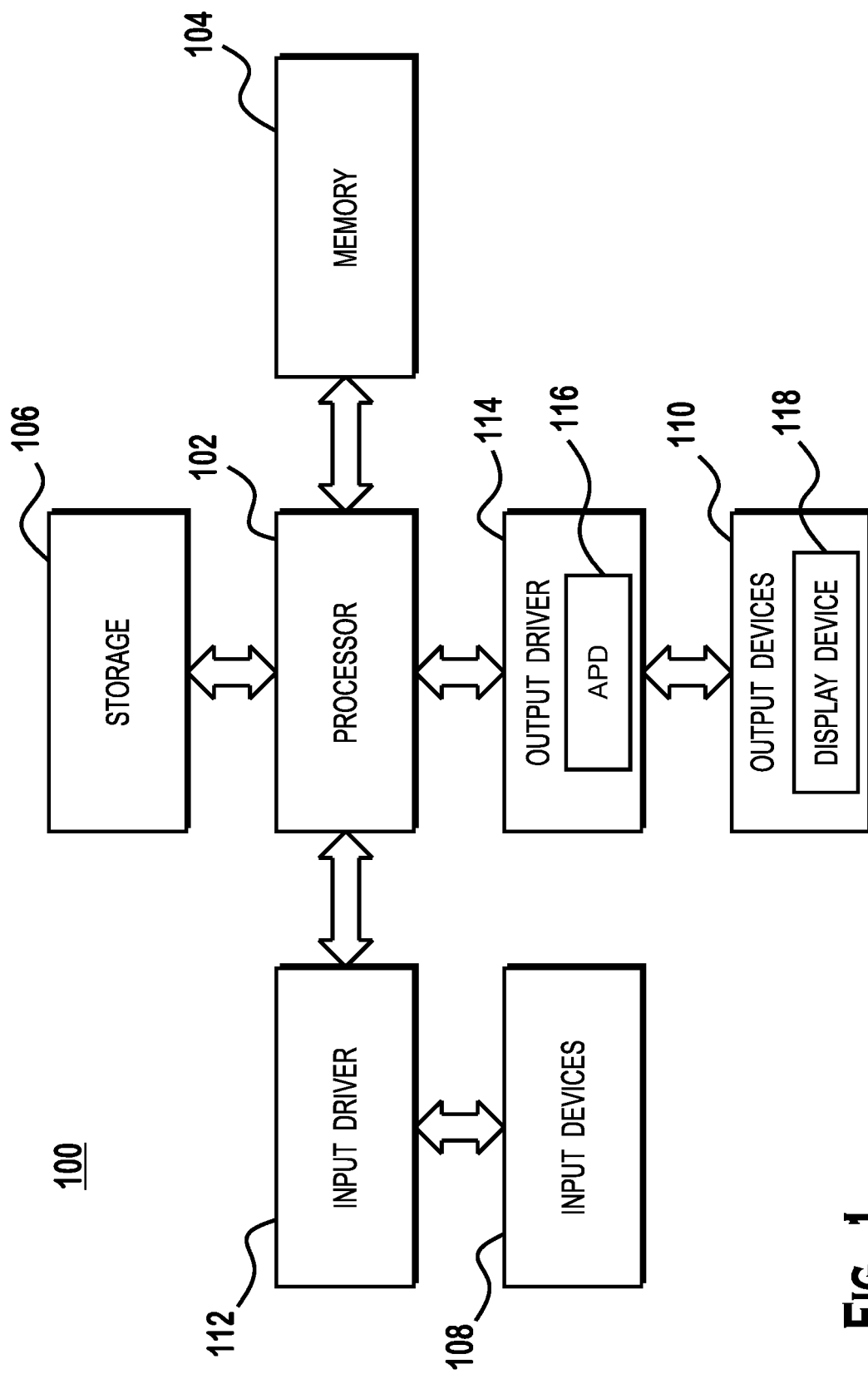
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
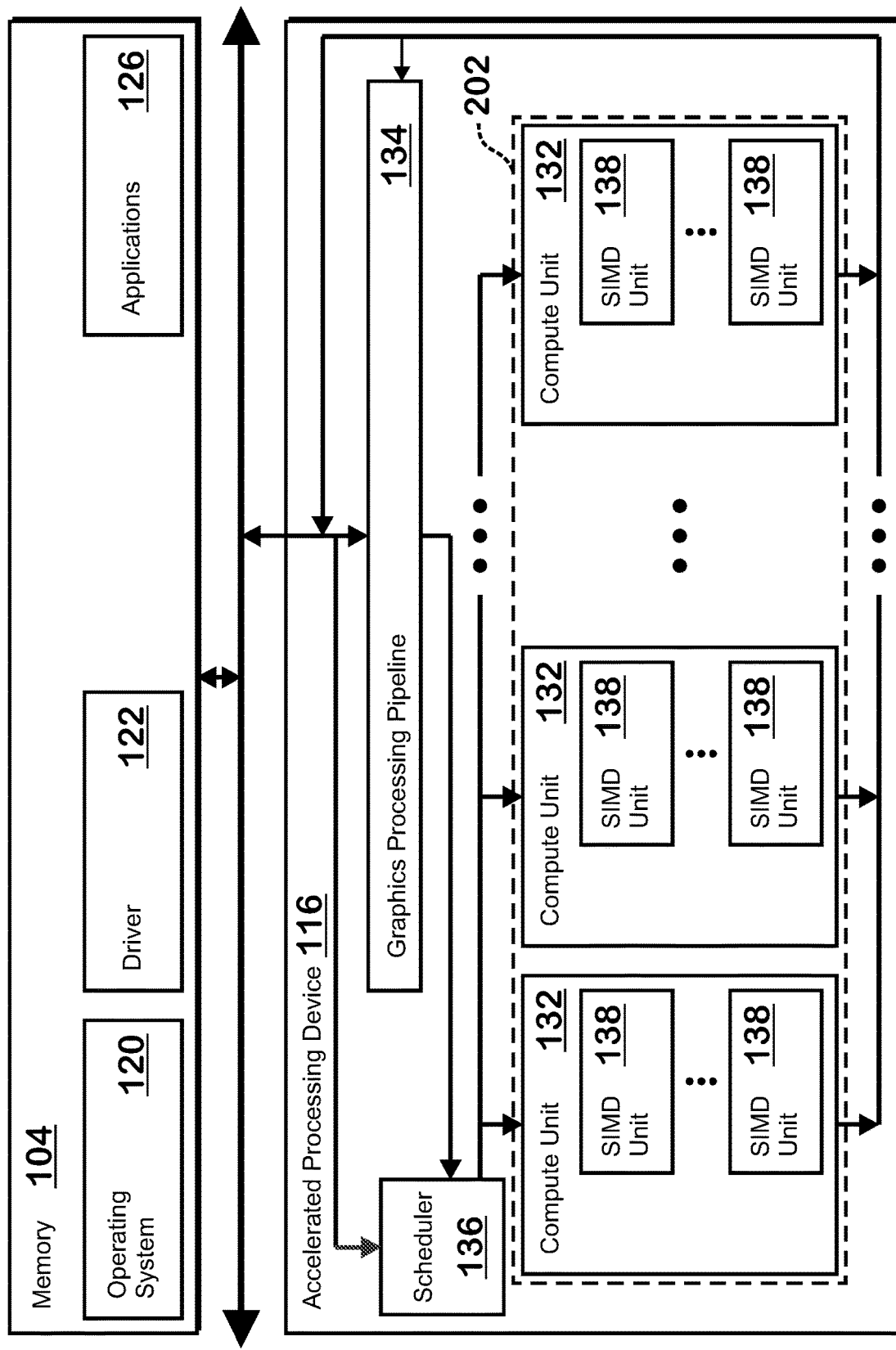
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
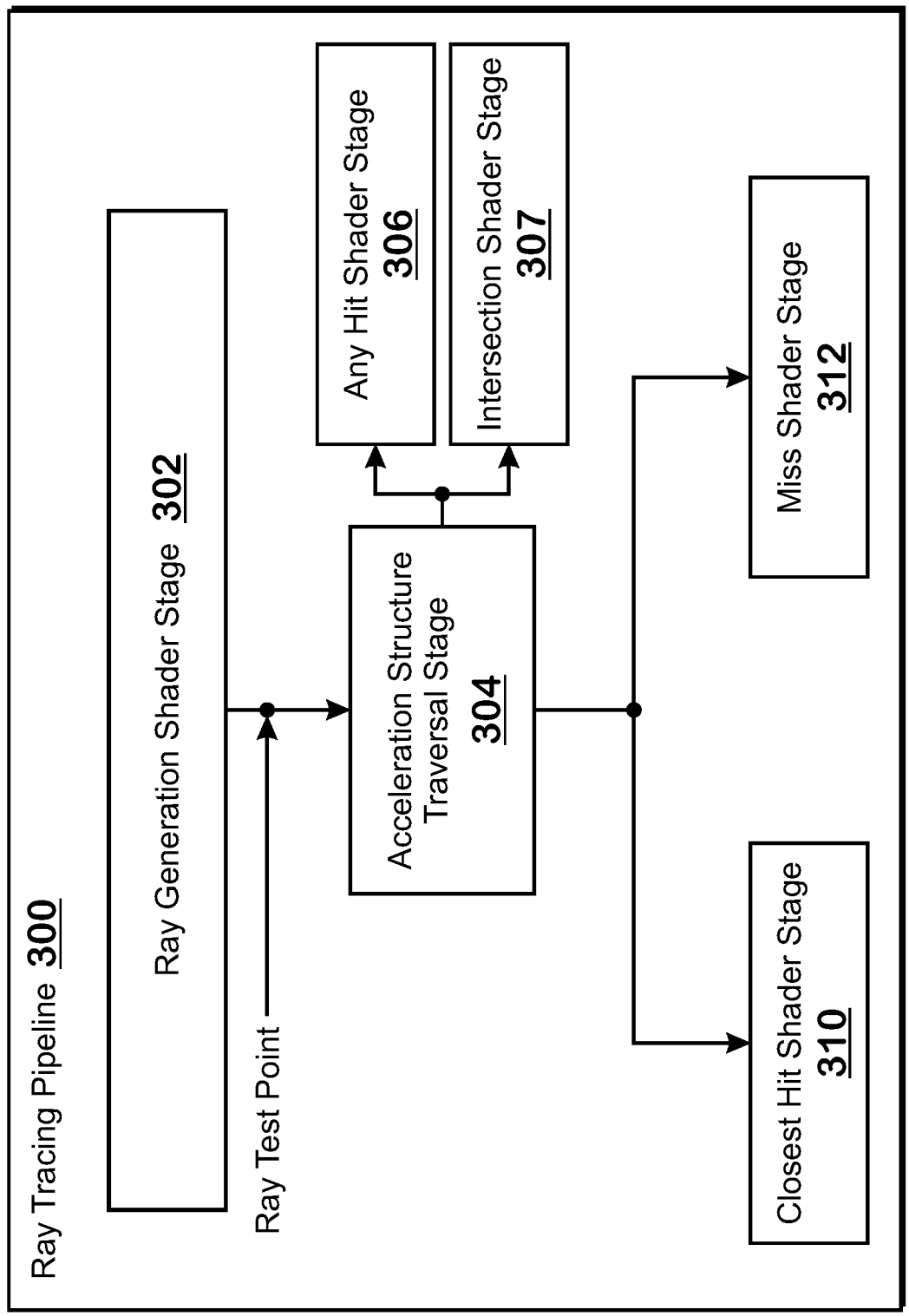
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
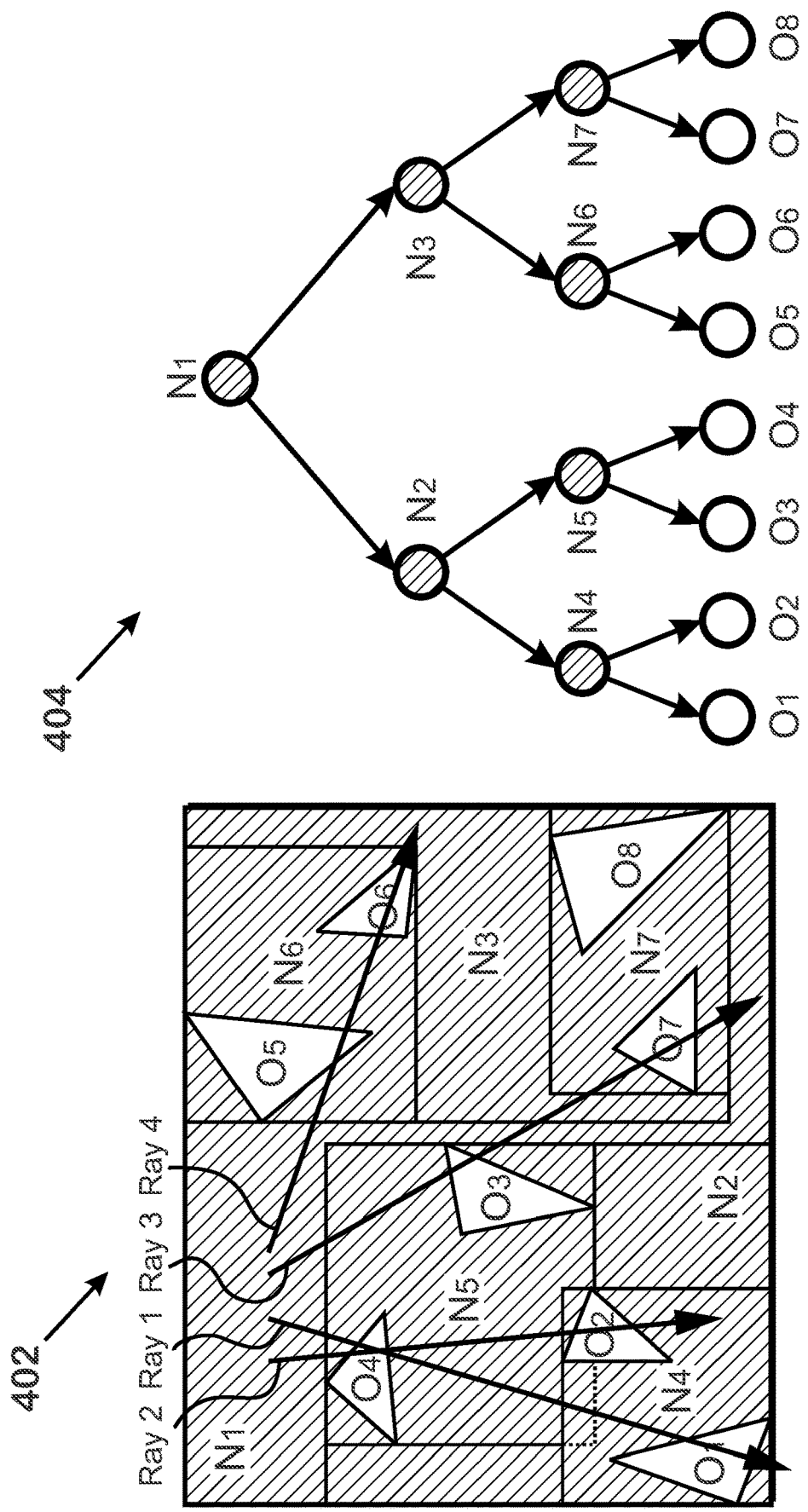
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As stated elsewhere herein, a ray intersection test involves traversing an acceleration structure such as a bounding volume hierarchy. This traversal encounters bounding box nodes, which are nodes having associated bounding boxes that bound all the geometry of the children. To keep the intersection test simple and efficient, bounding boxes are defined as being axis aligned. The intersection test is simplified in this situation because such bounding boxes are defined by sides having constant values in each dimension. However, axis-aligned bounding boxes have the drawback that poorly matching underling geometry will result in inefficiencies resulting from unnecessary additional bounding volume hierarchy traversal.

Figure 5:
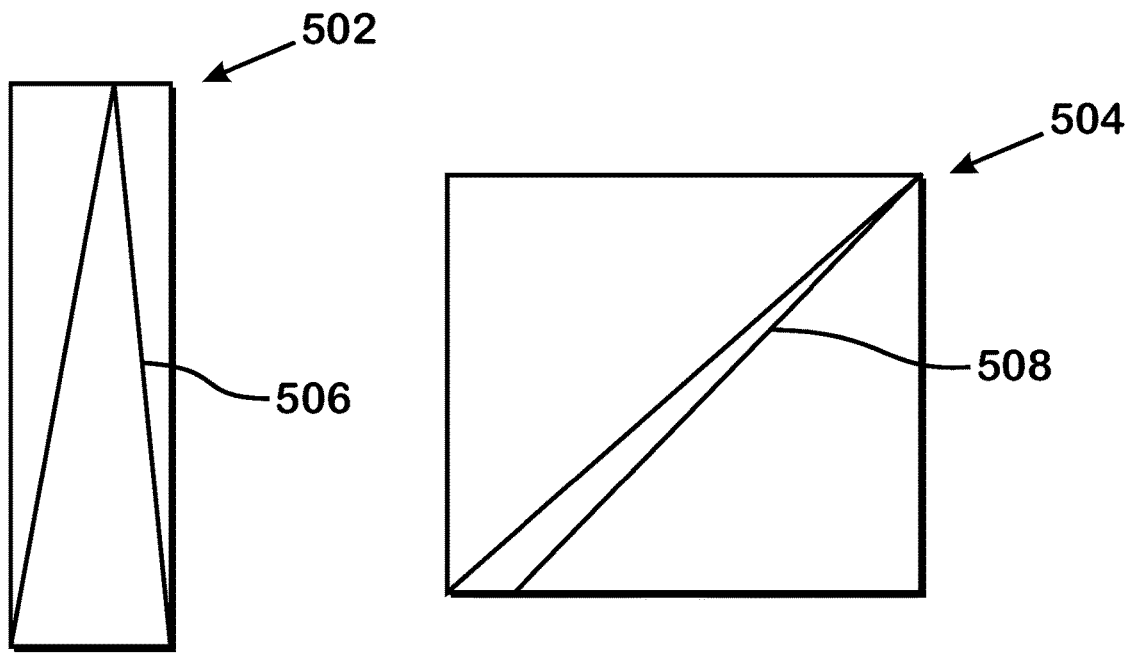
FIG. 5 is an illustration of a well-fit bounding box and a poorly-fit bounding box, according to an example.

FIG. 5 illustrates an example well-fit bounding box 502 and an example poorly-fit bounding box 504, according to an example. A first triangle 506 is illustrated within the well-fit bounding box 502 and a second triangle 508 is illustrated within the poorly-fit bounding box 504. The well-fit bounding box 502 is considered well-fit because a large amount of the space within the bounding box 502 is filled by the triangle 506 within that bounding box 502. By contrast, the poorly-fit bounding box 504 is considered poorly-fit because the triangle 508 within the bounding box 504 fills a very small amount of space of the bounding box 504. Poorly-fit bounding boxes can negatively impact performance because hits within poorly-fit bounding boxes that do not hit any underlying triangles are more common than hits within well-fit bounding boxes that do not hit any underlying triangles. Hits within bounding boxes that do not hit any underlying triangles are result in inefficiencies—it would be advantageous to stop traversal down a branch of a bounding volume hierarchy as early as possible if there are no triangles in that branch that are hit by the ray.

Poorly-fit bounding boxes exist because the bounding boxes are axis-aligned. An improvement includes "orienting" the bounding boxes by rotating the bounding box and all geometry within the bounding box to improve fit. In various implementations, an oriented bounding box is embodied within a bounding volume hierarchy 404 as information including an orientation, as well as the bounds of the oriented bounding box. This orientation can be thought of as defining a rotated coordinate system that is rotated with respect to the coordinate system of the parent of the oriented bounding box in one or more axes. In some examples, "orientation" includes at least two directions of rotation, each direction indicating rotation around a different axis. In some examples, orientation includes roll, pitch, and yaw. Note that oriented bounding boxes within a direct chain of parentage (e.g., a parent and child node or grandparent and grandchild node) combine their rotations. For example, a box node that is oriented applies its rotation to all descendants, and thus if one such descendant is oriented, then all descendants of that descendant have the combination of rotations from the box node and the descendant. By allowing for the option to use oriented bounding boxes, bounding boxes can be better fit to badly rotated geometry, improving performance.

In various examples, the rotation allows the bounding box test to be performed as an axis aligned bounding box test after the ray is rotated into the coordinate system of the oriented bounding box. More specifically, as the acceleration structure traversal stage 304 traverses the bounding volume hierarchy, if an oriented bounding box is encountered, the acceleration structure traversal stage 304 rotates the ray to be in the coordinate system of the oriented bounding box and performs the bounding box test for the ray against the box. Rotation "accumulates" if multiple oriented bounding boxes exist in the same ancestor chain during traversal. In one example, an oriented bounding box is encountered which results in the acceleration structure traversal stage 304 rotating the ray. A test against that oriented bounding box indicates a hit. Subsequently, the acceleration structure traversal stage 304 encounters a child of that oriented bounding box which is also rotated. The acceleration structure traversal stage 304 further rotates the ray based on the rotation of this child object.

Figure 6:
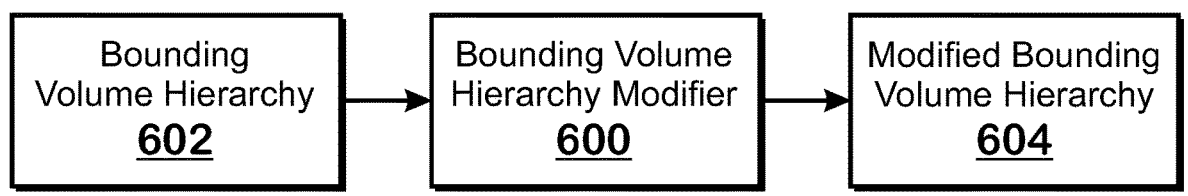
FIG. 6 illustrates a technique for introducing oriented bounding boxes into a bounding volume hierarchy.

FIG. 6 illustrates techniques for generating a bounding volume hierarchy having oriented bounding boxes, according to an example. A bounding volume hierarchy modifier 600 modifies an already generated bounding volume hierarchy 602 to generate a modified bounding volume hierarchy 604. Specifically, the bounding volume hierarchy modifier 600 modifies one or more of the bounding boxes of the bounding volume hierarchy to be one or more oriented bounding boxes based on an analysis of the bounding volume hierarchy 602. In various examples, the bounding volume hierarchy modifier 600 is implemented as software executing on a processor, as fixed-function hardware configured to perform the techniques described herein, or as a combination of software and fixed-function hardware. In various examples, the bounding volume hierarchy modifier 600 is software or firmware executing on the processor 102 or within the APD 116, or is a hardware module within the processor 102 or APD 116. The bounding volume hierarchy modifier 600 is implementable in any technically feasible manner.

Figure 7:
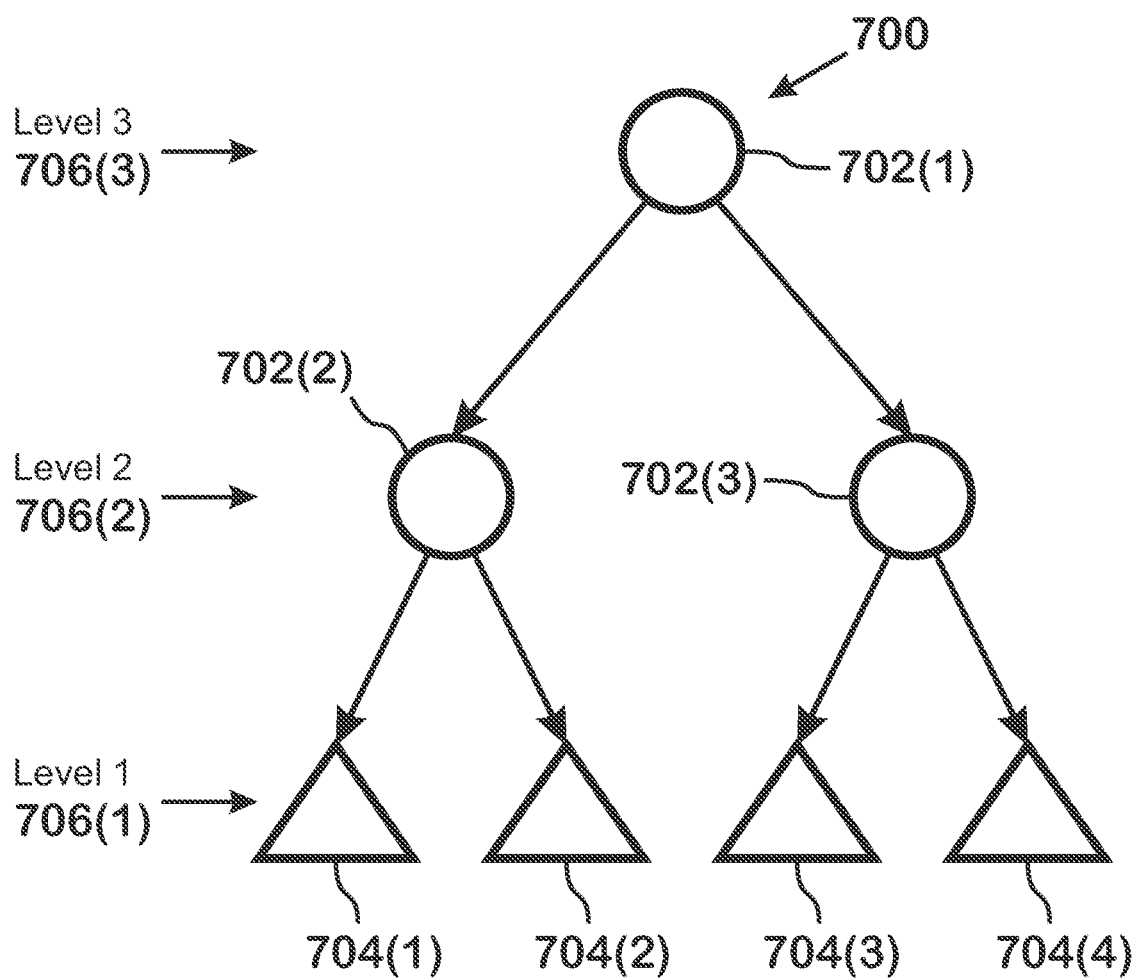
FIG. 7 illustrates an example bounding volume hierarchy.

FIG. 7 illustrates an example bounding volume hierarchy for illustrating details of the technique for generating the modified bounding volume hierarchy 604, according to an example. The bounding volume hierarchy modifier 600 analyzes a bounding volume hierarchy in a bottom-up manner. Specifically, the bounding volume hierarchy modifier 600 analyzes lower nodes before higher nodes. For each bounding box node analyzed, the bounding volume hierarchy modifier 600 determines whether that node should be an oriented bounding box node or not an oriented bounding box node, and modifies the bonding volume hierarchy accordingly.

The bounding volume hierarchy modifier 600 assigns each bounding box a cost score and a preferred orientation. The cost score is a combination of cost scores of each child of the bounding box 702. The cost score is an indication of how poorly fit a non-oriented bounding box would be for the children of the bounding box 702. The preferred orientation is a combination of the preferred orientations for the children of the bounding box 702.

In further detail, the cost score is an indication of the difference between a "fitness measure" for a bounding box if the bounding box were oriented and a "fitness measure" for the bounding box if the bounding box were not oriented. In general, a more well-fit bounding box has a total surface area that is smaller than a poorly-fit bounding box. In some examples, the bounding volume hierarchy modifier 600 generates the fitness measure for an oriented version of the bounding box by identifying a rotation for a bounding box deemed "optimal" and identifying the fitness metric for that rotation. In various examples, determining the bounding box deemed most optimal includes testing out different orientations for the bounding box and selecting the bounding box orientation that is most optimal. In some examples, the metric for determining whether a bounding box is most optimal is the total surface area of the bounding box. Thus in these examples, the bouncing box rotation deemed most optimal is the bounding box rotation having the lowest total surface area. Although an iterative approach has been described in which different bounding box rotations are tried to determine the bounding box rotation deemed most optimal, the present disclosure is not limited to such techniques and any technique for identifying a bounding box orientation deemed most optimal falls within the scope of the present disclosure.

The preferred orientation is combination of the preferred orientations of the children of the bounding box. More specifically, as described above, it is possible for any particular node to be "poorly-fit." In this situation, a rotation for the node that is considered "optimal" has a particular rotation direction and angle. It is possible for a bounding box to have multiple children, each of whose "optimal rotation" is different. The preferred orientation is a combination of these preferred orientations.

For each bounding box node encountered, the bounding volume hierarchy modifier 600 combines the cost scores for the children of the node and the preferred orientation for the children of that box node to generate a cost score and preferred orientation for the bounding box node. The bounding volume hierarchy modifier 600 then determines whether the children of the bounding box node should be oriented bounding boxes node based on this combination. In the situation that the bounding volume hierarchy modifier 600 determines that the children bounding box nodes should be oriented bounding boxes, the bounding volume hierarchy modifier 600 converts those bounding box nodes 702 into oriented bounding boxes and sets the cost score and preferred orientation for the parent bounding box to zero. The bounding volume hierarchy modifier 600 sets the rotation of each of the oriented bounding boxes to the preferred orientation for those bounding boxes. In the situation that the bounding volume hierarchy modifier 600 determines that the children of the bounding box node 702 should not be oriented bounding boxes, the bounding volume hierarchy modifier 600 assigns to the bounding box node 702, as the cost score and preferred orientation, the combined cost score and preferred orientation from the children of the bounding box node 702.

There are a number of ways to combine the cost from children for a bounding box node 702. In one example, combining the cost includes adding the costs of each of the children. Thus, in this example, the cost for a parent is the sum of the costs of the children of that parent. In another example, combining the cost includes performing a weighted sum. In some examples, the weights are determined by the number of triangles that are ancestors of each node. In other examples, the weights are determined by the total surface area of each child. In another example, combining the cost includes a probability to hit each node.

In some examples, combining the preferred orientation includes averaging the preferred orientations of the children node to obtain an intermediate orientation, which is assigned to the parent box node. The intermediate orientation is in between the preferred orientations of the child nodes. In some examples, the average is a weighted average, weighted by the cost of the child box nodes. More specifically, the preferred orientation of each box node is weighted with the cost of that box node. The resulting average preferred orientation tends towards the more heavily weighted (higher cost) box nodes.

Above, it is stated that the bounding volume hierarchy modifier 600 determines whether the children of a bounding box node should be oriented bounding boxes node based on the combination of cost and preferred orientation. In some examples, the bounding volume hierarchy modifier 600 makes this determination by determining whether the combined preferred orientation is sufficiently different from one or more of the children. In other words, if the average preferred orientation is not sufficiently characteristic of any of the preferred orientations of any of the children of a box node, then the bounding volume hierarchy modifier 600 converts each of those children to oriented bounding boxes. As stated above, the decision of whether to perform this conversion is based on the combined costs of the child box nodes and on the combined preferred orientations of the child box nodes. In one example, the bounding volume hierarchy modifier 600 determines the difference between a combined preferred orientation and the preferred orientation of one of the child box nodes. If the result is greater than a threshold number, then the bounding volume hierarchy modifier 600 determines that each of the child bounding box nodes should be oriented bounding box. In some examples, the bounding volume hierarchy modifier 600 performs this analysis for each child bounding box. In the event that the bounding volume hierarchy modifier 600 determines that the above result is greater than a threshold number for any such child, the bounding volume hierarchy modifier 600 determines that each child should be an oriented bounding box. In the event that the above result is not greater than a threshold for any such child, the bounding volume hierarchy modifier 600 determines that the child box nodes should not be made into oriented bounding boxes.

Conceptually, the above determination reflects the idea that if the children of box nodes have a preferred orientation that is too different from the combined (e.g., averaged) preferred orientation of all such children box nodes, then those children box nodes should become oriented bounding boxes. Using the cost to help make this decision helps to quantify the "error" between average and individual preferred orientations. For example, for a low cost with a large direction difference, not a lot would be gained by creating an oriented bounding box, since the cost is low. With a high cost and a low direction difference, it is satisfactory to not create oriented bounding boxes, since the preferred orientation is sufficiently represented in the parent node. However, with a high cost and a high direction difference, it is deemed that the computational price would be too high if the child box nodes were not made into oriented bounding boxes.

In some implementations, the bounding volume hierarchy modifier 600 performs the above operations in a bottom-up order, beginning with the triangles 704 and proceeding to the parents of the triangles 702, to the parents of those parents, and so on. In some implementations, for triangles, the preferred orientation is the direction that allows faces of the bounding box to be parallel to the triangle. In some implementations, the cost for triangles is the difference between the surface area of an axis-aligned bounding box that encloses the triangle and a bounding box rotated to the preferred orientation that encloses the triangle.

In FIG. 7, the nodes (triangle nodes 702 and box nodes 704) are illustrated in different "levels." As stated elsewhere, the bounding volume hierarchy modifier 600 performs the operations to designate bounding boxes as oriented bounding boxes or not oriented bounding boxes in a bottom-up manner. Thus the bounding volume hierarchy modifier 600 determines whether a bounding box should be oriented or not, and determines combined cost and preferred orientation of a bounding box after determining the same for each of the children (whether triangles or box nodes) of that bounding box. It is not necessary for the bounding volume hierarchy modifier 600 to make these determinations for all nodes of a particular level 706 before proceeding to a higher level 706. More specifically, determination of whether a box node is to be an oriented bounding box node is based on the children of that box node, and thus can proceed when the cost and direction information is available for those children, even if such information is not yet available for other nodes of the same level 706 as those children.

Figure 8:
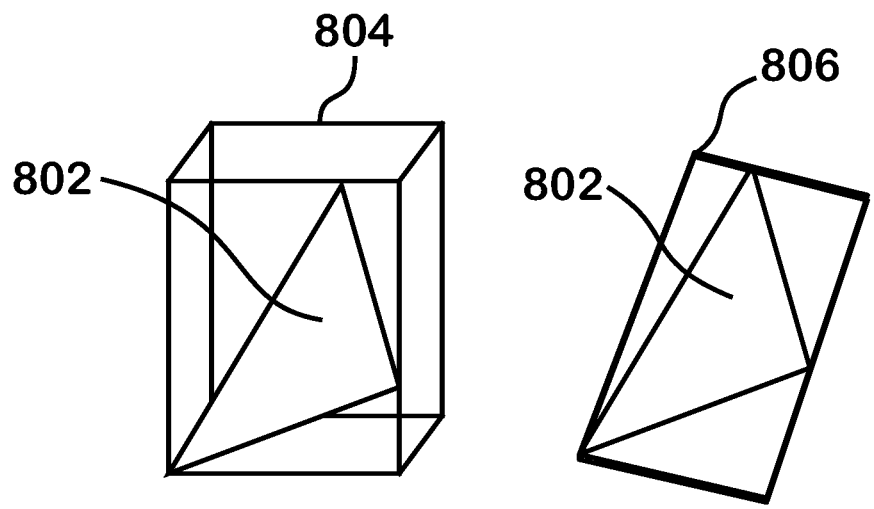
FIG. 8 illustrates an oriented bounding box and a non-oriented bounding box for a triangle.

FIG. 8 illustrates an example preferred orientation for a triangle 802. The triangle is not parallel to any of the axes (which are not shown). Therefore, an axis aligned bounding box 804 that encloses the triangle 802 has a relatively large total surface area. An oriented bounding box 806, having at least one face parallel to the face of the triangle, has a much lower total surface area. In some implementations, the cost for the triangle 802 is the difference between the total surface area of the non-oriented bounding box 804 and the total surface area of the oriented bounding box 806. In some examples, the preferred orientation for the triangle 802 is defined as the plane in which the triangle is located.

Figure 9:
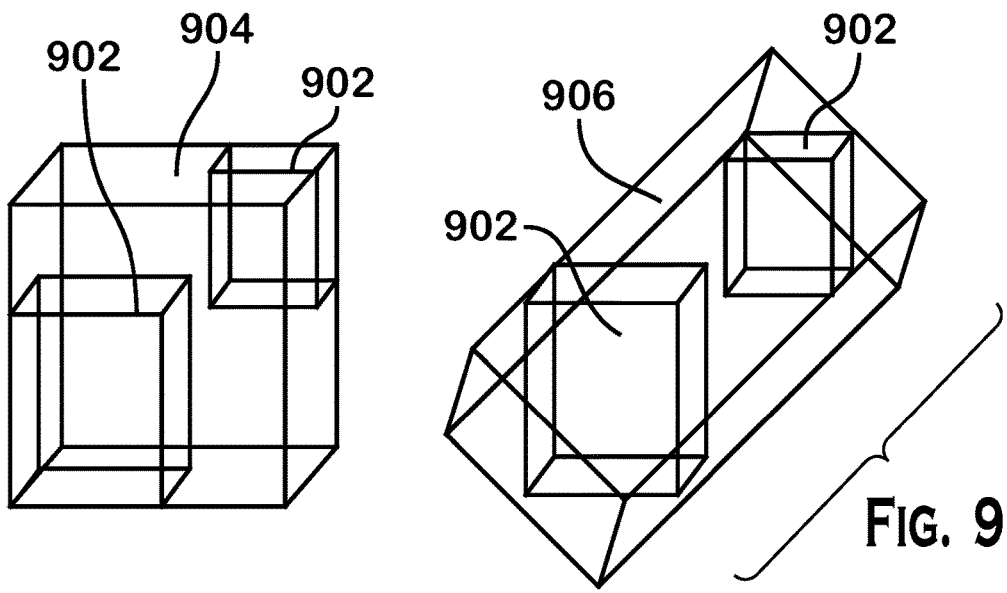
FIG. 9 illustrates an oriented bounding box and a non-oriented bounding box for child bounding boxes.

FIG. 9 illustrates oriented bounding boxes for a box node whose children are also box nodes, according to an example. Two child box nodes 902 are illustrated, and one non-oriented bounding box 904 is illustrated. In addition, an oriented box node 906 is illustrated. The oriented bounding box 906 is an example of a bounding box oriented to improve the fit of the internal geometry. In an example, the oriented bounding box 906 has a smaller total surface area than the non-oriented bounding box 904.

It has been described that well-fit oriented bounding boxes have faces that are parallel to the triangles. In some examples, it is not necessary for well-fit oriented bounding boxes to be parallel to such triangles. In some examples, the bounding volume hierarchy modifier 600 is able to select from a fixed number of bounding box rotations and select the one that is considered the best-fit (e.g., has the lowest total surface area). In some examples, the precision of the data format used to store the orientation limits the degree to which a bounding box is capable of being parallel to a triangle. The above is also true for bounding boxes that are the parent of other bounding boxes, in addition to bounding boxes that parent triangles. More specifically, as described above, it is possible for the precision with which a direction is selected for a bounding box to be limited. Thus, in some implementations, the bounding volume hierarchy modifier 600 selects a direction that results in the lowest fit measure (e.g., lowest cost) out of a set of available directions.

Above, it is stated that one possible measure for the fitness metric of bounding boxes is the total surface area of the bounding box. In some examples, this measure is used to build a bounding volume hierarchy. In some such examples, a bounding volume hierarchy builder (e.g., software, hardware, or a combination thereof) generates a bounding volume hierarchy by progressively subdividing input geometry. The configuration of each subdivision is selected to minimize the total surface area the bounding boxes surrounding each subdivision of input geometry. Each subdivision is assigned to a bounding box, thereby generating the tree structure of the bounding volume hierarchy. In some implementations, the bounding volume hierarchy building saves the total surface area amounts for each bounding boxes and provides that information to the bounding volume hierarchy modifier 600 to use when analyzing the bounding volume hierarchy to generate oriented bounding boxes.

Figure 10:
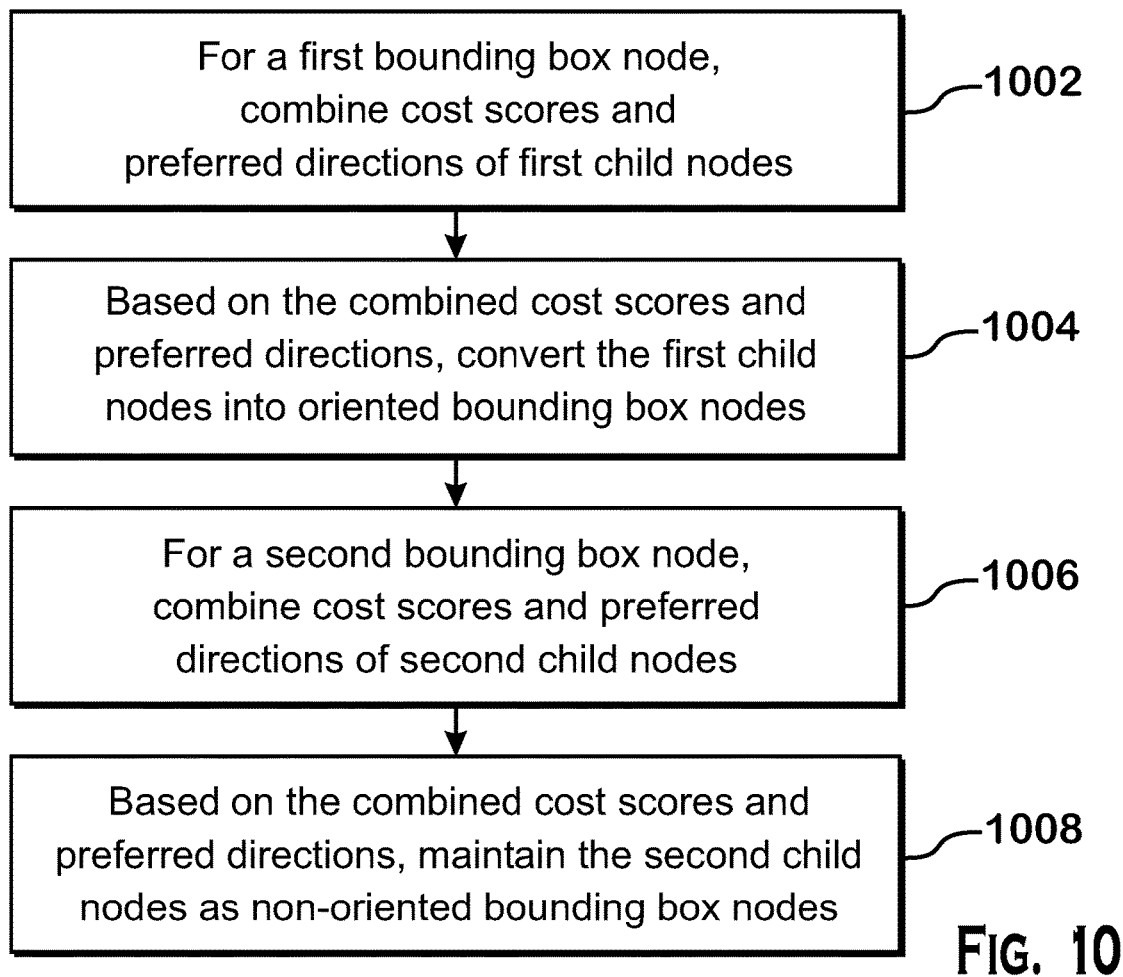
FIG. 10 is a flow diagram of a method for introducing oriented bounding boxes into a bounding volume hierarchy.

FIG. 10 is a flow diagram of a method 1000 for including oriented bounding boxes in a bounding volume hierarchy, according to an example. Although described with respect to the system of FIGS. 1-9, those of skill in the art will understand that any system, configured to perform the steps of the method 1000 in any technically feasible order, falls within the scope of the present disclosure.

At step 1002, a bounding volume hierarchy modifier 600 combines preferred orientations of child nodes, for a first bounding box node. In various examples, combining preferred orientations for child scores includes averaging the preferred orientations. In some examples, combining the preferred orientations includes performing a weighted average for the preferred orientations of the child box nodes, weighted by the cost scores of those child nodes.

At step 1004, based on the combined cost scores and preferred orientations, the bounding volume hierarchy modifier 600 converts the children of the first bounding box node into oriented bounding box nodes. In an example, the bounding volume hierarchy modifier 600 obtains a difference between the average preferred orientation of the child box nodes and the preferred orientations of each of those child box nodes and determines that this difference is higher than threshold. In other words, in this example, the bounding volume hierarchy modifier 600 determines that the average preferred orientation is sufficiently uncharacteristic of any child box node, so that the child box nodes should be converted into oriented bounding boxes.

At step 1006, for a second bounding box node, the bounding volume hierarchy modifier 600 combines the preferred orientations of the child nodes using any technically feasible technique such as those described herein. At step 1008, based on the combination, the bounding volume hierarchy modifier 600 maintains the child box nodes as non-oriented bounding box nodes.

It should be understood that many variations are possible based on the disclosure herein. In some implementations, where a root node of a bounding volume hierarchy has a preferred orientation (for example, after analyzing the other nodes of the bounding volume hierarchy), the bounding volume hierarchy modifier 600 modifies that root node to be an oriented bounding box having the preferred orientation. In some examples, this conversion occurs where the root node has one or more of a cost above a threshold, a preferred orientation that differs from an unrotated orientation by more than a threshold amount, or a combination of cost and orientation difference (as defined elsewhere herein) that is greater than a threshold amount. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for modifying a bounding volume hierarchy, the method comprising:
generating, for a node of the bounding volume hierarchy, a preferred orientation based on a set of child nodes;
based on a difference between the generated preferred orientation and a preferred orientation of the node, modifying the bounding volume hierarchy by performing one of converting the child nodes into oriented bounding box nodes, or maintaining the set of child nodes as non-oriented bounding box nodes: and
performing rendering operations by evaluating a ray based on the bounding volume hierarchy.

2. The method of claim 1, wherein generating the preferred orientation based on the set of child nodes comprises averaging preferred orientations of the child nodes.

3. The method of claim 1, wherein generating the preferred orientation based on the set of child nodes comprises performing a weighted average of preferred orientations of the child nodes, wherein each preferred orientation is weighted by a cost of a respective child node.

4. The method of claim 3, wherein the cost of a respective child node is a score that is reflective of a difference between a first fitness measure and a second fitness measure, wherein the first fitness measure is a fitness measure for a bounding box for the child node rotated to a preferred orientation and the second fitness measure is a fitness measure for a bounding box for the child node not rotated to the preferred orientation.

5. The method of claim 4, wherein the first fitness measure is a total surface area for the bounding box for the child node rotated to the preferred orientation.

6. The method of claim 1, wherein:
converting the child nodes into oriented bounding box nodes includes assigning, as a cost for node, a cost of zero; and
maintaining the set of child nodes as non-oriented bounding box nodes includes assigning, as a cost for the node, a cost equal to a combination of costs of the set of child nodes.

7. The method of claim 1, wherein:
converting the child nodes into oriented bounding box nodes includes assigning, as a preferred orientation for the node, a preferred orientation indicating no rotation; and
maintaining the set of child nodes as non-oriented bounding box nodes includes assigning, as a preferred orientation for the node, a combination of preferred orientations of the set of child nodes.

8. The method of claim 1, wherein, based on a difference between the generated preferred orientation and a preferred orientation of the node, performing one of converting the child nodes into oriented bounding box nodes, or maintaining the set of child nodes as non-oriented bounding box nodes includes determining that a difference between the preferred orientation of the node and the generated preferred orientation is greater than a threshold.

9. The method of claim 1, wherein, maintaining the set of child nodes as non-oriented bounding box nodes includes determining that a difference between the preferred orientation of the node and the generated preferred orientation is not greater than a threshold.

10. A device for modifying a bounding volume hierarchy, the device comprising:
a memory configured to store a first bounding box node and a second bounding box node; and
a processor configured to:
generating, for a node of the bounding volume hierarchy, a preferred orientation based on a set of child nodes;
based on a difference between the generated preferred orientation and a preferred orientation of the node, modifying the bounding volume hierarchy by performing one of converting the child nodes into oriented bounding box nodes, or maintaining the set of child nodes as non-oriented bounding box nodes; and
performing rendering operations by evaluating a ray based on the bounding volume hierarchy.

11. The device of claim 10, wherein generating the preferred orientation based on the set of child nodes comprises averaging preferred orientations of the child nodes.

12. The device of claim 10, wherein generating the preferred orientation based on the set of child nodes comprises performing a weighted average of preferred orientations of the child nodes, wherein each preferred orientation is weighted by a cost of a respective child node.

13. The device of claim 12, wherein the cost of a respective child node is a score that is reflective of a difference between a first fitness measure and a second fitness measure, wherein the first fitness measure is a fitness measure for a bounding box for the child node rotated to a preferred orientation and the second fitness measure is a fitness measure for a bounding box for the child node not rotated to the preferred orientation.

14. The device of claim 13, wherein the first fitness measure is a total surface area for the bounding box for the child node rotated to the preferred orientation.

15. The device of claim 10, wherein:
converting the child nodes into oriented bounding box nodes assigning, as a cost for the node, a cost of zero; and
maintaining the set of child nodes as non-oriented bounding box nodes includes assigning, as a cost for the node, a cost equal to a combination of costs of the set of child nodes.

16. The device of claim 10, wherein:
converting the child nodes into oriented bounding box nodes includes assigning, as a preferred orientation for the node, a preferred orientation indicating no rotation; and
maintaining the set of child nodes as non-oriented bounding box nodes includes assigning, as a preferred orientation for the node, a combination of preferred orientations of the set of child nodes.

17. The device of claim 10, wherein, based on a difference between the generated preferred orientation and a preferred orientation of the node, performing one of converting the child nodes into oriented bounding box nodes, or maintaining the set of child nodes as non-oriented bounding box nodes includes determining that a difference between the preferred orientation of the node and the generated preferred orientation is greater than a threshold.

18. The device of claim 10, wherein, maintaining the set of child nodes as non-oriented bounding box nodes includes determining that a difference between the preferred orientation of the node and the generated preferred orientation is not greater than a threshold.

19. A non-transitory computer-readable medium storing instructions that, when executed by a processor, cause the processor to perform operations comprising:
generating, for a node of a bounding volume hierarchy, a preferred orientation based on a set of child nodes;
based on a difference between the generated preferred orientation and a preferred orientation of the node, modifying the bounding volume hierarchy by performing one of converting the child nodes into oriented bounding box nodes, or maintaining the set of child nodes as non-oriented bounding box nodes; and
performing rendering operations by evaluating a ray based on the bounding volume hierarchy.

20. The non-transitory computer-readable medium of claim 19, wherein generating the preferred orientation based on the set of child nodes comprises averaging preferred orientations of the child nodes.

* * * * *